United States Patent
Riva et al.

(10) Patent No.: US 10,028,116 B2
(45) Date of Patent: Jul. 17, 2018

(54) DE-SILOING APPLICATIONS FOR PERSONALIZATION AND TASK COMPLETION SERVICES

(71) Applicant: MICROSOFT TECHNOLOGY LICENSING, LLC, Redmond, WA (US)

(72) Inventors: Oriana Riva, Redmond, WA (US); Suman Kumar Nath, Redmond, WA (US); Douglas Christopher Burger, Bellevue, WA (US); Earlence Fernandes, Ann Arbor, MI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 273 days.

(21) Appl. No.: 14/618,854

(22) Filed: Feb. 10, 2015

(65) Prior Publication Data

US 2016/0234624 A1    Aug. 11, 2016

(51) Int. Cl.
| | |
|---|---|
| *G06F 11/34* | (2006.01) |
| *H04W 4/60* | (2018.01) |
| *H04W 4/00* | (2018.01) |
| *H04M 1/725* | (2006.01) |
| *G06Q 30/02* | (2012.01) |

(52) U.S. Cl.
CPC .......... *H04W 4/60* (2018.02); *G06F 11/3438* (2013.01); *G06Q 30/02* (2013.01); *H04M 1/72522* (2013.01); *H04W 4/003* (2013.01); *G06F 11/3476* (2013.01)

(58) Field of Classification Search
CPC ............................. H04W 4/00; H04M 1/725
See application file for complete search history.

(56) References Cited

U.S. PATENT DOCUMENTS

| | | | |
|---|---|---|---|
| 7,917,891 B2 | 3/2011 | Dinges et al. | |
| 8,099,673 B2 | 1/2012 | Parkinson | |
| 8,386,966 B1 | 2/2013 | Attinasi et al. | |
| 8,661,015 B2 | 2/2014 | Karana | |
| 8,806,328 B2 | 8/2014 | Oz | |
| 8,819,492 B2 | 8/2014 | Dande et al. | |
| 9,183,587 B1 * | 11/2015 | Rosner | G06Q 30/0641 |
| 2003/0023528 A1 * | 1/2003 | Wilce | G06F 17/24 705/35 |
| 2007/0016563 A1 * | 1/2007 | Omoigui | G06F 17/3061 |

(Continued)

OTHER PUBLICATIONS

Iqbal, et al., "Effects of Intelligent Notification Management on Users and Their Tasks", In Proceedings of the SIGCHI Conference on Human Factors in Computing Systems, Apr. 5, 2008, 10 pages.

(Continued)

*Primary Examiner* — David Choi (57) ABSTRACT

Examples of the disclosure enable a plurality of applications to be managed. Some examples include a mobile device that receives a template associated with an application, captures one or more user interactions with the application, and determines one or more user interests by comparing the one or more user interactions with a plurality of entities included in the template. Examples of the disclosure enable the mobile device to analyze the user interactions to provide valuable information about user interest, preference, and/or intent and provide tailored services to a user.

20 Claims, 6 Drawing Sheets

(56) References Cited

U.S. PATENT DOCUMENTS

| | | | |
|---|---|---|---|
| 2007/0208751 | A1 | 9/2007 | Cowan et al. |
| 2007/0238520 | A1* | 10/2007 | Kacmarcik ............. A63F 13/10 463/33 |
| 2007/0288454 | A1 | 12/2007 | Bolivar et al. |
| 2009/0063538 | A1* | 3/2009 | Chitrapura ........ G06F 17/30887 |
| 2009/0197582 | A1 | 8/2009 | Lewis et al. |
| 2009/0198579 | A1 | 8/2009 | Lewis et al. |
| 2010/0192178 | A1* | 7/2010 | Candelore ............. G06K 9/325 725/39 |
| 2011/0288941 | A1 | 11/2011 | Chandra et al. |
| 2012/0123866 | A1 | 5/2012 | Li et al. |
| 2012/0185787 | A1 | 7/2012 | Lisse et al. |
| 2012/0221571 | A1 | 8/2012 | Orman |
| 2012/0221712 | A1 | 8/2012 | Sullivan et al. |
| 2012/0290392 | A1 | 11/2012 | Joshi |
| 2012/0316956 | A1 | 12/2012 | Nath et al. |
| 2012/0330978 | A1 | 12/2012 | Yih et al. |
| 2013/0046619 | A1 | 2/2013 | Translateur et al. |
| 2013/0212487 | A1* | 8/2013 | Cote ........................ G06F 3/048 715/745 |
| 2013/0263280 | A1* | 10/2013 | Cote ....................... G06F 21/62 726/26 |
| 2013/0298038 | A1* | 11/2013 | Spivack ................ H04L 65/403 715/753 |
| 2013/0311946 | A1* | 11/2013 | Kwon .................. G06F 3/04817 715/811 |
| 2013/0332442 | A1 | 12/2013 | Liu et al. |
| 2013/0339924 | A1 | 12/2013 | Chen et al. |
| 2014/0035949 | A1 | 2/2014 | Singh et al. |
| 2014/0053189 | A1* | 2/2014 | Lee ..................... H04N 21/4858 725/37 |
| 2014/0074452 | A1 | 3/2014 | Carmi |
| 2014/0143654 | A1 | 5/2014 | Yang et al. |
| 2014/0250425 | A1 | 9/2014 | Kumar et al. |
| 2014/0298041 | A1 | 10/2014 | Consalus et al. |
| 2014/0347160 | A1* | 11/2014 | Chen .................. G07C 9/00158 340/5.53 |
| 2015/0033111 | A1* | 1/2015 | Sevenster ............. G06F 17/248 715/230 |
| 2015/0074546 | A1* | 3/2015 | Slawson ................ G06F 3/0484 715/747 |
| 2015/0161238 | A1* | 6/2015 | Son .......................... G06F 3/167 707/728 |
| 2015/0186156 | A1* | 7/2015 | Brown ................. G06F 3/04817 715/706 |
| 2015/0347374 | A1* | 12/2015 | Rehtijarvi ......... G06F 17/30091 715/747 |
| 2015/0378578 | A1* | 12/2015 | Zhang ...................... G06F 3/048 715/765 |
| 2016/0094491 | A1* | 3/2016 | Fedorov .................. H04L 51/02 709/206 |
| 2016/0234624 | A1* | 8/2016 | Riva ...................... H04W 4/003 |

OTHER PUBLICATIONS

Kim, et al., "AdNext: A Visit-Pattern-Aware Mobile Advertising System for Urban Commercial Complexes", In Proceedings of the 12th Workshop on Mobile Computing Systems and Applications, Mar. 1, 2011, 6 pages.

"Microsoft Advertising", Retrieved on: Mar. 19, 2013, Available at: http://advertising.microsoft.com/splitter, 1 page.

Mittal, et al., "Empowering Developers to Estimate App Energy Consumption", In Proceedings of the 18th Annual International Conference on Mobile Computing and Networking, Aug. 22, 2012, 11 pages.

"Microsoft Mobile Ad Control", Retrieved on: Mar. 19, 2013, Available at: http://advertising.microsoft.com/mobile-apps, 2 pages.

Ovide, et al., "Mobile Ads: Here's What Works and What Doesn't", Published on: Sep. 27, 2012, Available at: http://online.wsj.com/article/SB10000872396390444083304578016373342878556.html?mod=WSJ_hp_EditorsPicks, 4 pages.

Pathak, et al., "Where is the Energy Spent Inside My App? Fine Grained Energy Accounting on Smartphones with Eprof", In Proceedings of the 7th ACM European Conference on Computer Systems, Apr. 10, 2012, 14 pages.

Ribeiro-Neto, et al., "Impedance Coupling in Contenttargeted Advertising", In Proceedings of the 28th Annual International ACM SIGIR Conference on Research and Development in Information Retrieval, Aug. 15, 2005, 8 pages.

Khalaf, Simon, "Mobile Apps: Dominating the Web and Challenging Television", Published on: Dec. 5, 2012, Available at: http://blog.flurry.com/bid/92105/Mobile-Apps-We-Interrupt27-This-Broadcast, 4 pages.

Wu, et al., "Keyword Extraction for Contextual Advertisement", In Proceedings of the 17th International Conference on World Wide Web, Apr. 21, 2008, 2 pages.

"Yahoo Publisher Network", Retrieved on: Mar. 19, 2013, Available at: http://advertisingcentral.yahoo.com/publisher/index, 1 page.

Yih, et al., "Finding Advertising Keywords on Web Pages", In Proceedings of the 15th International Conference on World Wide Web, May 23, 2006, 10 pages.

"International Search Report and Written Opinion for PCT Application No. PCT/US2014/041991", Filed Date: Jun. 11, 2014, dated Dec. 17, 2014, 13 pages.

"Localytics In-App", Published on: Jul. 5, 2014, Available at: http://support.localytics.com/In-App, 8 pages.

Even, Alon, "Understanding User Behavior via Visual In-App Analytics", Published on: Jan. 2014, Available at: http://onlinebehavior.com/analytics/in-app-analytics, 4 pages.

"Flurry", Retrieved on: Nov. 12, 2014, Available at: http://www.flurry.com, 1 page.

"Preemptive Solutions", Retrieved on: Nov. 12, 2014, Available at: http://www.preemptive.com/, 1 page.

Agichtein, et al., "Snowball: Extracting Relations from Large Plain-Text Collections", In Proceedings of the 5th ACM Conference on Digital Libraries, Jun. 2000, pp. 85-94.

Alfonseca, et al., "An Unsupervised Method for General Named Entity Recognition and Automated Concept Discovery", In Proceedings of the 1st International Conference on General WordNet, Jan. 2002, 9 pages.

Asahara, et al., "Japanese Named Entity Extraction with Redundant Morphological Analysis", In Proceedings of Conference of the North American Chapter of the Association for Computational Linguistics on Human Language Technology, vol. 1, May 2003, pp. 8-15.

Collins, et al., "Unsupervised Models for Named Entity Classification", In Proceedings of the Joint SIGDAT Conference on Empirical Methods in Natural Language Processing and Very Large Corpora, Jun. 1999, pp. 100-110.

Crussell, et al., "MAdFraud: Investigating Ad Fraud in Android Applications", In Proceedings of the 12th Annual International Conference on Mobile Systems, Applications, and Services, Jun. 16, 2014, pp. 123-134.

Cucchiarelli, et al., "Unsupervised Named Entity Recognition Using Syntactic and Semantic Contextual Evidence", In Computational Linguistics, vol. 27, Issue 1, Mar. 2001, pp. 123-131.

Danny, Timm, "Flurry Releases Newest App Use Stats", Published on: Sep. 2, 2014, Available at: http://tech.co/flurry-app-stats-2014-09, 5 pages.

Eirinaki, et al., "Web Mining for Web Personalization", In Journal ACM Transactions on Internet Technology, vol. 3, Issue1, Feb. 2003, 27 pages.

Evans, Richard, "A Framework for Named Entity Recognition in the Open Domain", In Proceedings of Recent Advances in Natural Language Processing III, Sep. 10, 2003, 8 pages.

"Google Analytics", Retrieved on: Nov. 13, 2014, Available at: http://www.google.com/analytics/, 2 pages.

Hao, et al., "SIF: A Selective Instrumentation Framework for Mobile Applications", In Proceeding of the 11th Annual International Conference on Mobile Systems, Applications, and Services, Jun. 25, 2013, pp. 167-180.

(56) References Cited

OTHER PUBLICATIONS

Hao, et al., "PUMA: Programmable UI-Automation for Large-Scale Dynamic Analysis of Mobile Apps", In Proceedings of the 12th Annual International Conference on Mobile Systems, Applications, and Services, Jun. 16, 2014, pp. 204-217.
Hoffart, et al., "Robust Disambiguation of Named Entities in Text", In Proceedings of the Conference on Empirical Methods in Natural Language Processing, Jul. 27, 2011, pp. 782-792.
Knights, et al., "Detecting Topic Drift", In Proceedings of Recent Advances in Natural Language Processing V, Nov. 13, 2014, 1 page.
Lidin, Serge, "Inside Microsoft .NET IL Assembler", In Publication of Microsoft Press, Feb. 6, 2002, 4 pages.
Liu, et al., "DECAF: Detecting and Characterizing Ad Fraud in Mobile Apps", In Proceedings of the 11th USENIX Conference on Networked Systems Design and Implementation, Apr. 2, 2014, 16 pages.
McCallum, et al., "Early Results for Named Entity Recognition with Conditional Random Fields, Feature Induction and Web-Enhanced Lexicons", In Proceedings of Conference on Computational Natural Language Learning, May 31, 2003, 4 pages.
Nadeau, et al., "A Survey of Named Entity Recognition and Classification", In Proceedings of Lingvisticae Investigationes, vol. 30, Issue 1, Jan. 2007, 20 pages.
Nath, et al., "SmartAds: Bringing Contextual Ads to Mobile Apps", In Proceeding of the 11th Annual International Conference on Mobile Systems, Applications, and Services, Jun. 25, 2013, pp. 111-123.
Pasca, et al., "Organizing and Searching the World Wide Web of Facts—Step One: the One-Million Fact Extraction Challenge", In Proceedings of American Association for Artificial Intelligence, Jul. 16, 2006, pp. 1400-1405.
Perone, Christian S., "Pyevolve", Published on: Sep. 18, 2011, Available at: http://pyevolve.sourceforge.net/wordpress/?p=1589, %202014, 16 pages.
Ravindranath, et al., "Automatic and Scalable Fault Detection for Mobile Applications", In Proceedings of the 12th Annual International Conference on Mobile Systems, Applications, and Services, Jun. 16, 2014, pp. 190-203.
Ravindranath, et al., "AppInsight: Mobile App Performance Monitoring in the Wild", In Proceedings of the 10th USENIX Conference on Operating Systems Design and Implementation, Oct. 8, 2012, pp. 107-120.
Riloff, et al., "Learning Dictionaries for Information Extraction by Multi-level Bootstrapping", In Proceedings of the Sixteenth National Conference on Artificial Intelligence, Jul. 1999, 6 pages.
Sarawagi, Sunita, "Information Extraction", In Proceedings of Foundations and Trends in Databases, vol. 1, Issue 3, Mar. 2008, pp. 261-377.
Tata, et al., "Estimating the Selectivity of tf-idf based Cosine Similarity Predicates", In ACM SIGMOD Record, vol. 36 Issue 2, Jun. 2007, pp. 7-12.
Wang, et al., "Targeted Disambiguation of Ad-Hoc, Homogeneous Sets of Named Entities", In Proceedings of the 21st International Conference on World Wide Web, Apr. 16, 2012, pp. 719-728.
White, Ryen William, "Implicit Feedback for Interactive Information Retrieval", In PhD Thesis, Apr. 16, 2012, 317 pages.
Zemirli, Nesrine, "WebCap: Inferring the User's Interests Based on a Real-Time Implicit Feedback", In Proceedings of Seventh International Conference on Digital Information Management, Aug. 22, 2012, pp. 62-67.
U.S. Appl. No. 13/916,996, Nath, et al., "Contextual Mobile Application Advertisements", filed Jun. 13, 2013.
Seneviratne, et al., "Reconciling Bitter Rivals: Towards Privacy-Aware and Bandwidth Efficient Mobile Ads Delivery Networks", In Fifth International Conference on Communication Systems and Networks, Jan. 7, 2013, 10 pages.
"Admob", Retrieved on: Mar. 18, 2013, Available at: http://www.google.com/ads/admob/, 2 pages.
"Enabling Keyword-targeted Ads and Google Certified Ad Networks in Your Applications", Retrieved on: Mar. 18, 2013, Available at: http://support.google.com/admob/answer/1307264?hl=en, 2 pages.
"Google Adsense", Retrieved on: Mar. 18, 2013, Available at: http://www.google.com/adsense, 1 page.
"Advertising.com", Retrieved on: Mar. 18, 2013, Available at: http://www.advertising.com/, 1 page.
Bloom, Burton H., "Space/Time Trade-offs in Hash Coding with Allowable Errors", In Journal of Communications of the ACM, vol. 13, Issue 7, Jul. 1970, 5 pages.
Broder, et al., "A Semantic Approach to Contextual Advertising", In Proceedings of the 30th Annual International ACM SIGIR Conference on Research and Development in Information Retrieval, Jul. 23, 2007, 8 pages.
Broder, et al., "Network Applications of Bloom Filters: A Survey", In Journal of Internet Mathematics, vol. 1, Issue 4, Retrieved on: Mar. 18, 2013, 25 pages.
Dave, Kushal, "Computational Advertising: Leveraging User Interaction & Contextual Factors for Improved Ad Retrieval & Ranking", In Proceedings of the 20th International Conference Companion on World Wide Web, Mar. 28, 2011, 5 pages.
Davidson, et al., "MoRePriv: Mobile OS Support for Application Personalization and Privacy", In Technical Report (MSR-TR-2012-50), May 3, 2012, 17 pages.
Enck, et al., "TaintDroid: An Information-Flow Tracking System for Realtime Privacy Monitoring on Smartphones", In Proceedings of 9th USENIX Symposium on Operating Systems Design and Implementation, Oct. 4, 2010, 15 pages.
Falaki, et al., "Diversity in Smartphone Usage", In Proceedings of the 8th International Conference on Mobile Systems, Applications, and Services, Jun. 15, 2010, 16 pages.
Gordon, Mary Ellen, "Flurry Blog", Published on: Mar. 13, 2013, Available at: http://blog.flurry.com/, 30 pages.
Grace, et al., "Unsafe Exposure Analysis of Mobile In-App Advertisements", In Proceedings of the Fifth ACM Conference on Security and Privacy in Wireless and Mobile Networks, Apr. 16, 2012, 12 pages.
Gotz, et al., "Privacy-Aware Personalization for Mobile Advertising", In Proceedings of the ACM Conference on Computer and Communications Security, Oct. 16, 2012, 14 pages.
"IAD Network", Retrieved on: Mar. 19, 2013, Available at: http://advertising.apple.com/, 1 page.
"International Search Report and Written Opinion Issued in PCT Application No. PCT/US2016/015874", dated Apr. 13, 2016, 13 pages.

\* cited by examiner

DE-SILOING APPLICATIONS FOR PERSONALIZATION AND TASK COMPLETION SERVICES

BACKGROUND

At least some time spent on mobile devices is spent using applications ("apps"). Some known apps are isolated programs that display content as a set of pages that a user can interact with and navigate between. The functionality of at least some known apps is limited to displaying content expressly requested by the user.

Known methods and systems for tracking and/or analyzing user interaction with an app include manually annotating the app. Manually annotating the app, however, requires additional programming time and/or effort and may be time consuming, tedious, and/or error-prone. Moreover, known methods and systems for tracking and/or analyzing user interaction, particularly when done with little to no developer effort, are computation-heavy and require a large amount of memory when stored locally or impose network overhead and potentially violate user privacy when executed on remote servers.

SUMMARY

Examples of the disclosure enable a plurality of applications to be managed on a mobile device. Some examples include a mobile device that receives a template associated with an application, captures one or more user interactions with the application, and determines one or more user interests by comparing the one or more user interactions with a plurality of entities included in the template.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Examples of the disclosure enable a computing device, such as a mobile device, to effectively and efficiently manage a plurality of applications to provide tailored services to a user. As used herein, the term tailored service is directed to any service, function, and/or operation that is configured for and/or personalized to a particular user. Tailored services may be provided and/or generated based on user information (e.g., a user configuration, a user profile, and/or a user history). For example, tailored services include, without limitation, automatically launching an application and/or task sequence, initiating and/or performing a task using a personal digital assistant, and/or repeating a user interaction to enable relevant content to be retrieved. Tailored services may include, for example, targeted services. In some examples, applications are used to capture user interactions, such as purchases a user makes, restaurants the user reserves, and/or songs to which the user listens. The user interaction is analyzed to provide valuable information about user interest, preference, and/or intent. For example, knowing that a user has selected a restaurant in an app enables an operating system to provide options to invoke another app containing reviews of the restaurant and/or suggest similar restaurants. Moreover, in some examples, analyzing user interaction enables at least some applications to be directly invoked based on user interest, preference, and/or intent, ultimately completing tasks more effectively. In some examples, templates are generated offline, and entities are extracted online. The templates may be used to extract entities and/or to guide the extraction of content in the application.

Aspects of the disclosure enable behavioral analytics data to be aggregated from a plurality of applications and make the data available on the device operating system, to its services, and/or to other applications. In this way, data may be used to enable better personalization and novel functionality with little development and/or overhead while leveraging templates to reduce online operations and preserving privacy by processing use-specific information at the client device. Templates and code for logging usage data are automatically injected into the application binary code. In some examples, entity templates are generated offline in a user-agnostic manner and associated with contents of the application during runtime. In at least some examples, entity templates include data associated with user-interface controls (e.g., entity type, path-to-root in the user-interface tree). Structural similarities across applications and within the application are exploited when extracting entities from the contents of the application. In some examples, relevant content is determined based at least in part on indicators of interest including clicks on user-interface controls indicating positive sentiment (e.g., "Like", "Share", "Pin"), exit actions (e.g., opening a link in the browser, viewing a menu of a restaurant), time spent, number of taps, entity recurrence, and/or cross-application interactions. In some examples, a user interaction within an application is replayable. By incorporating behavioral analytics data in the manner described in this disclosure, some examples increase system functionality, increase user interaction performance, reduce processor load, and/or improve operating system resource allocation.

Figure 1:
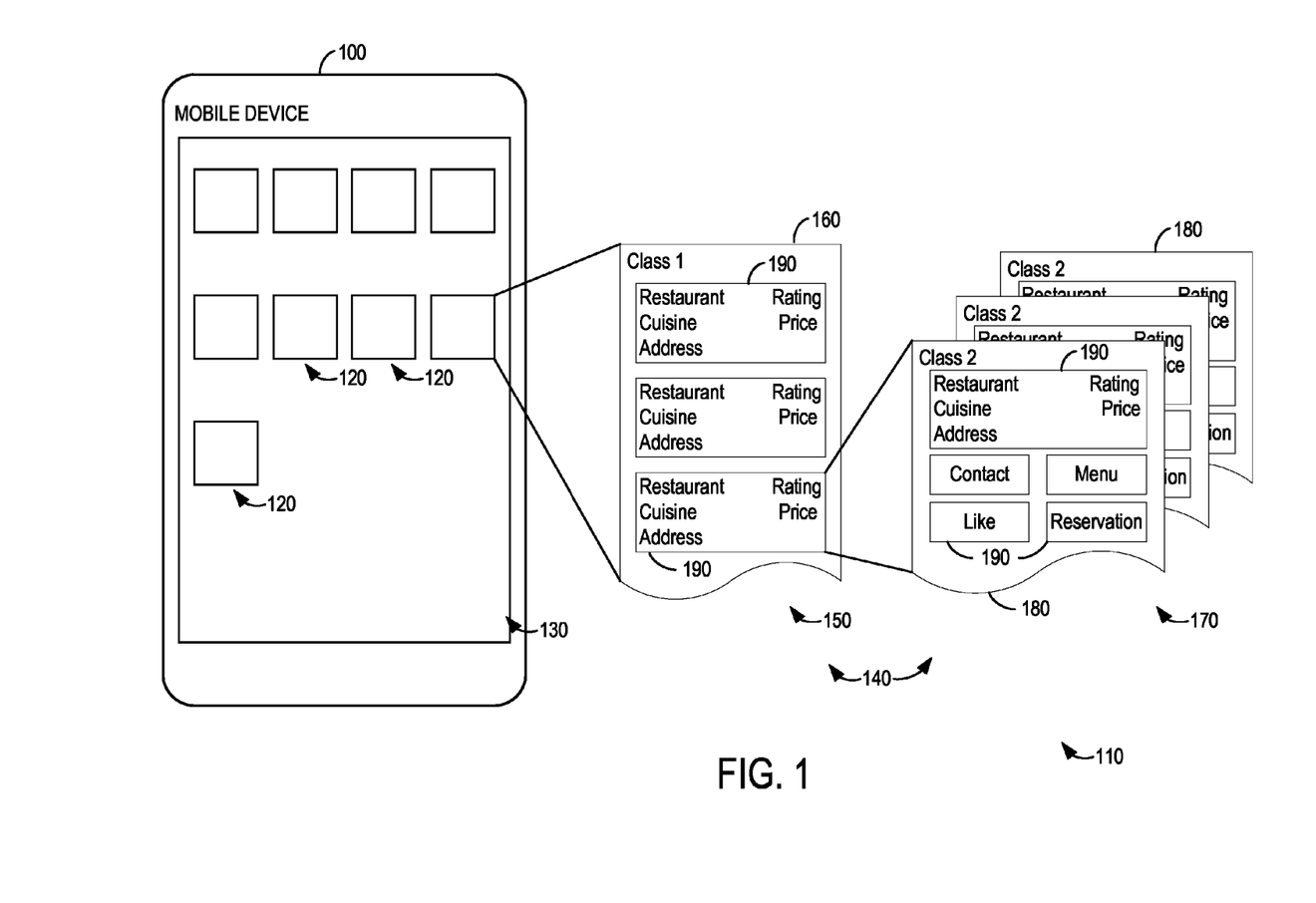
FIG. 1 is a schematic diagram illustrating an exemplary mobile device including one or more applications that may be implemented on the mobile device.

FIG. 1 is a schematic diagram illustrating an exemplary mobile device 100 including one or more applications ("apps") 110 that may be implemented on the mobile device 100. In some examples, the mobile device 100 presents an icon 120 for each app 110 on a user interface 130 (e.g., a touch screen display) that enables the app 110 to be executed on the mobile device 100. Mobile device 100 may include any number of apps 110 that enable the mobile device 100 to function as described herein.

An app 110 includes one or more page classes 140, each of which is instantiated by one or more pages. In some examples, each page includes one or more user-interface (UI) elements 190. Example UI elements 190 include buttons, textboxes, lists, and images. In at least some examples, the UI elements 190 include and/or are associated with content (e.g., a textbox includes and/or is associated with a text string). In at least some examples, a UI element 190 is nested within another UI element 190. For example, a "parent" UI elements 190 (e.g., a list) includes and/or contains one or more "child" UI elements 190 (e.g., a textbox) within the parent UI element 190. Some UI elements 190 (e.g., buttons) are interactive and have associated event handlers. For example, a user interacts with and navigates between pages of the app 110 by interacting with UI elements 190 and a back button provided on at least some mobile devices 100.

In some examples, content is arranged on a page based on a UI layout or structure defined in its page class 140. For example, pages instantiated from the same page class 140 have the same UI structure but potentially different content. In this example, a restaurant booking app 110 includes two page classes 140: a first class ("Class 1") 150 associated with one or more first pages 160 showing a list including a plurality of restaurants, and a second class ("Class 2") 170 associated with one or more second pages 180 showing detailed information associated with a restaurant. Apps 110 may include any number of page classes 140 that enables the app 110 to function as described herein.

In this example, the first page 160 includes UI elements 190 that enable a restaurant to be selected from the list of restaurants, and the second page 180 includes UI elements 190 that enable information to be viewed, the restaurant to be contacted, a menu to be viewed, the restaurant to be endorsed or "liked", and/or a reservation to be made. In this example, the first page 160 may be instantiated to show a list of restaurants proximate to, for example, a current location of the mobile device 100, and the second page 180 may be instantiated to display detailed information associated with a restaurant selected, for example, from a list shown on a first page 160. Each page is able to be instantiated any number of times that enables the app 110 to function as described herein.

Figure 2:
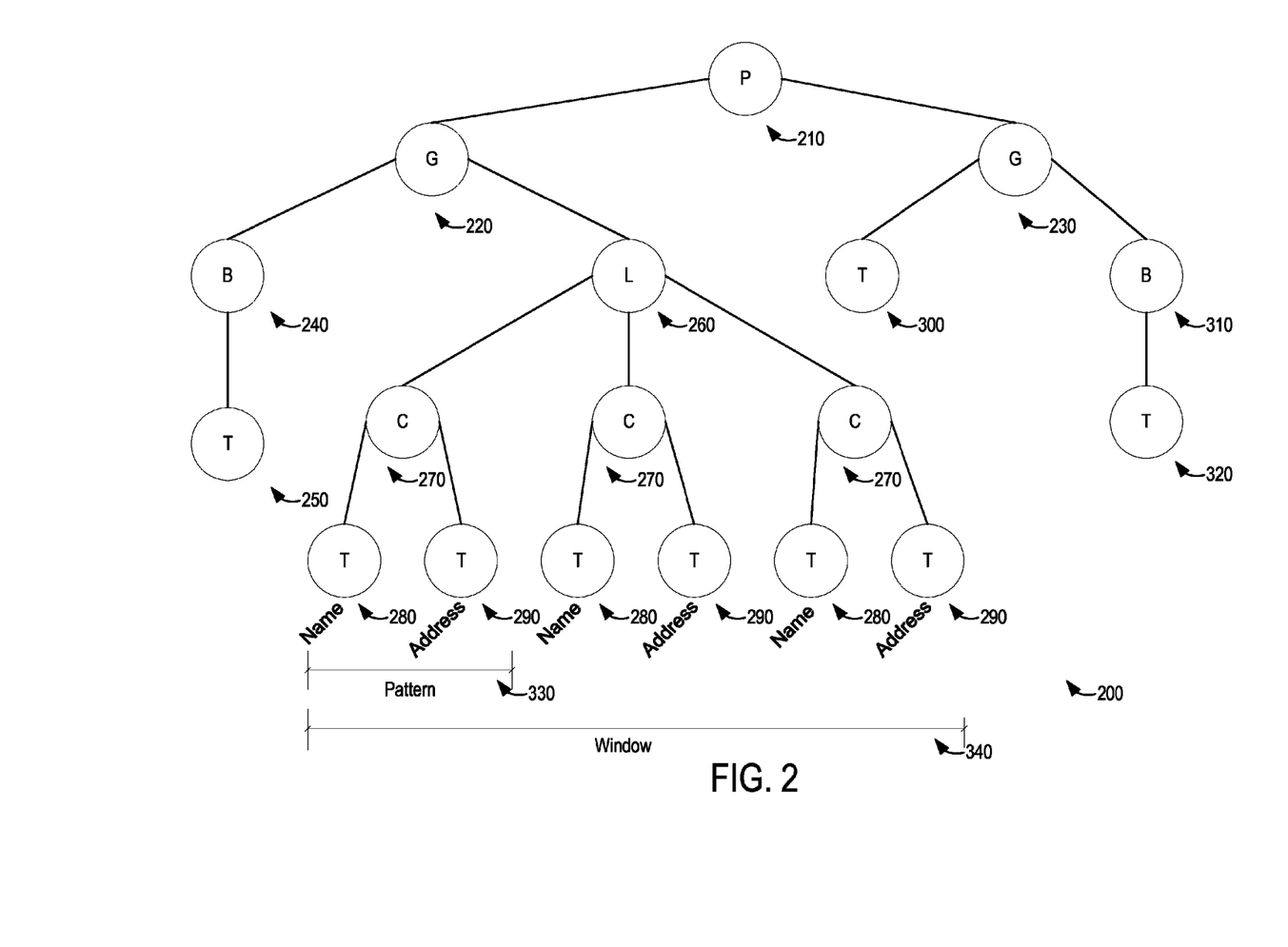
FIG. 2 is a schematic diagram illustrating relationships between elements of an application such as shown in FIG. 1.

FIG. 2 is a schematic diagram illustrating relationships between UI elements 190 (shown in FIG. 1) included in the app 110 (shown in FIG. 1). The user interacts with or visits a UI element 190 within an app 110. In this example, the UI elements 190 are schematically arranged as nodes in a tree 200. The app 110 includes one or more pages 210, such as the first page 160 or the second page 180. In this example, a page 210 includes a first table or grid 220 and a second table or grid 230. For example, a child UI element 190 (e.g., the first grid 220 or the second grid 230) is contained within its parent UI element 190 (e.g., the page 210).

In this example, the first grid 220 includes a button 240 including text 250 and a list 260 including a plurality of custom arrangements 270. In this example, each custom arrangement 270 includes a first text 280 (e.g., a name) and a second text 290 (e.g., an address). In this example, the second grid 230 includes a table 300 and a button 310 including text 320.

At least some apps 110 include a repeated sequence or pattern 330 of a plurality of UI elements 190. In this example, each custom arrangement 270, which includes a respective first text 280 and a respective second text 290, is identified as a pattern 330. Moreover, at least some apps 110 include a repeated sequence or pattern window 340 including a plurality of patterns 330. In this example, a list-like structure of homogenous objects (e.g., patterns 330) is identified as a pattern window 340.

Figure 3:
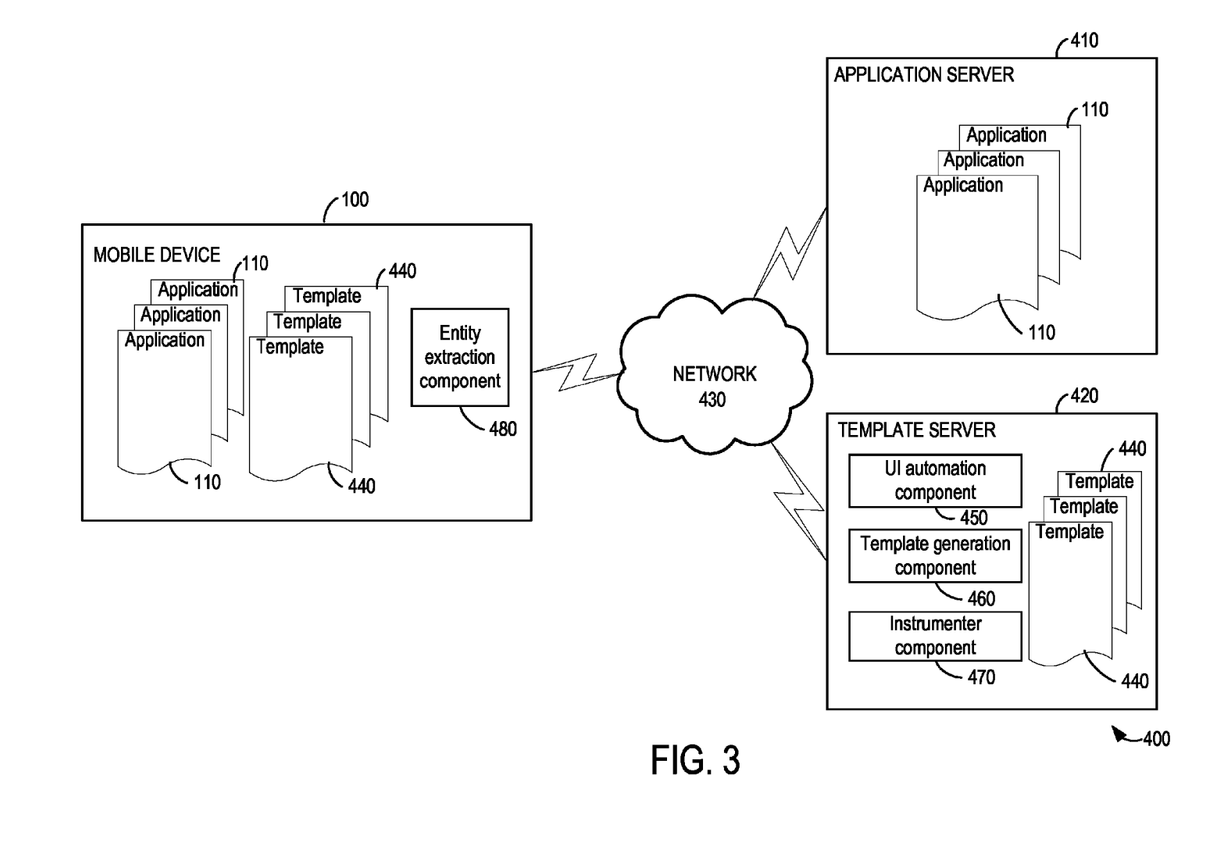
FIG. 3 is a schematic diagram illustrating an example system including one or more mobile devices, such as the mobile device shown in FIG. 1, and one or more servers communicatively coupled to the one or more mobile devices.

FIG. 3 is a schematic diagram illustrating an example system 400 including a mobile device 100, an application server 410 (e.g., a marketplace for apps), and a template server 420 communicatively coupled to each other via a network 430. Communication between the mobile device 100, the application server 410, and the template server 420 may occur using any protocol or mechanism over any wired or wireless connection.

In this example, the application server 410 is configured to provide and/or store one or more apps 110. The apps 110 are configured to provide a functionality to the mobile device 100. Example apps include mail application programs, web browsers, calendar application programs, address book application programs, messaging programs, media applications, location-based services, search programs, and the like. The apps 110 may communicate with counterpart apps or services such as web services accessible via the network 430. For example, the apps 110 may represent client-side apps on the mobile device 100 that correspond to server-side services executing in the cloud and/or server-side components stored in the cloud, the application server 410, the template server 420, and/or other memory area accessible by the mobile device 100. Such examples reduce the computational and storage burden on the mobile device 100.

In this example, the template server 420 is configured to provide and/or store one or more templates 440. In at least some examples, one or more templates 440 are generated by the template server 240 and/or made available for download with the app 110 at the application server 410. Structural properties of the app 110 (e.g., the UI structure) are exploited to annotate the app 110 with semantic information (e.g., metadata such as entity type) that remains valid during runtime. Each template 440 includes a plurality of entities that are associated with UI elements 190. At least some UI elements 190 are associated with a single entity. Example single-entity UI elements 190 include textboxes including text for one type of information (e.g., a restaurant name, an address, a telephone number). Each single-entity UI element 190 is independently customizable and, thus, assignable with precise semantics. In some examples, text of each UI element is associated with a name, a variety of related metadata, and/or usage information. In some examples, the templates 440 are configured to provide at runtime context to user interactions with the apps 110 and, thus, enable the apps 110 to be more efficiently and effectively exploited, with low overhead on the mobile device 100.

In some examples, the template 440 is updated when and/or after the app 110 is updated. For example, the update to the app 110 is detected and/or identified by the mobile device 100, and the associated template 440 is automatically requested and/or downloaded by the mobile device 100 based on the identification of the app update. In another example, an updated app 110 is detected and/or identified to be on the mobile device 100 by the template server 420, and the updated template 440 is automatically generated by the template server 420 based on the identification of the updated app 110. In yet another example, an updated template 440 is associated with an updated app 110 prior to the updated app 110 being downloaded by the mobile device 100, and the updated template 440 is downloaded by the mobile device 100 concurrently with or after the updated app 110. Alternatively, the app 110 and the template 440 may be updated and/or downloaded by or from any computing device and at any time that enables the system 400 to function as described herein.

In some examples, the template server 420 includes a UI automation component 450, a template generation component 460, and an instrumenter component 470. The UI automation component 450 is configured to automatically navigate the app 110 and capture and/or log one or more user interactions with one or more UI elements 190 from the app 110 in a user-agnostic manner and/or without human involvement. The template generation component 460 is configured to extract the UI elements 190 and contained text, associate the UI elements 190 with entities, and generate templates 440 including a mapping of the UI elements 190 with the associated entities. The instrumenter component 470 is configured to inject logging code into the apps 110. At least some templates 440 and logging code are injected into the application binary code on the mobile device 100 to enable an app 110 to extract one or more entities during runtime. Alternatively or in addition, the templates 440 and/or the logging code may be injected at any level that enables the apps 110 to function as described herein. In at least some examples, the templates and/or logging code are injected without additional developer input, such that the mobile device 100 is configured to perform the function as described herein without modifying the underlying app 110.

In this example, the mobile device 100 is configured to retrieve and/or download one or more apps 110 from the application server 410 and/or one or more templates 440 from the template server 420, and locally store the one or more apps 110 and one or more templates 440 at the mobile device 100. In at least some examples, the application server 410 retrieves and/or downloads one or more templates 440 from the template server 420, and the mobile device 100 retrieves and/or downloads one or more apps 110 and their respective templates 440 from the application server 410. In some examples, the mobile device 100 includes an entity extraction component 480 configured to log user interactions and analyze the user interactions using the templates 440. In at least some examples, an entity contained in a UI element extracted using the template 440 includes a name and a list of key-value pairs indicating various semantic information of the content, as well as syntactical information about where the entity appears in the application. For example:

```
name='Izumi',
info={type='restaurant',cuisine='Japanese',price='cheap'},
app='[Restaurant application name]', appPage=0xAD4352,
uiElement=0x342
5A
```

The extracted entities may be stored in an entity table that operating system (OS) services and other apps 110, if granted permission, may query by using, for example, standard structured query language (SQL) query. For example:

```
SELECT cuisine FROM [Application name]
WHERE info.type='restaurant'
AND interaction.num_taps > 10
```

Figure 4:
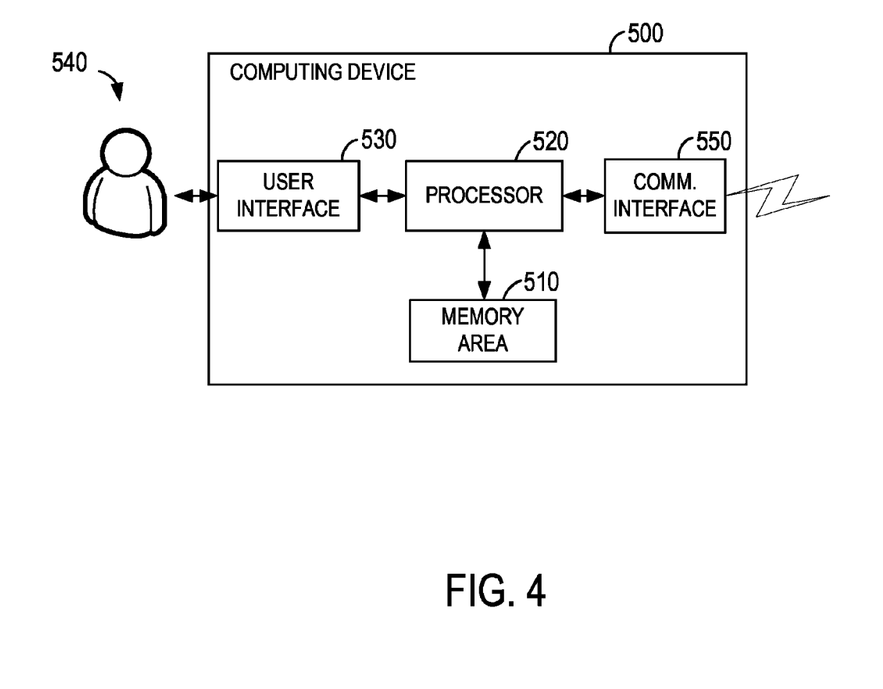
FIG. 4 is a schematic diagram illustrating an example computing device, such as the mobile device shown in FIG. 1 or one of the servers shown in FIG. 3.

FIG. 4 is a schematic diagram illustrating an example computing device 500, such as a mobile device 100 (shown in FIG. 1), an application server 410 (shown in FIG. 3), and/or a template server 420 (shown in FIG. 3). While some examples of the disclosure are illustrated and described herein with reference to a computing device being a mobile device 100, an application server 410, and/or a template server 420, aspects of the disclosure are operable with any computing device and/or server that executes instructions (e.g., as apps 110, operating system (OS) functionality, or both) to implement the operations and functionality associated with the computing device and/or server. For example, the computing device 500 may include a portable media player, a mobile telephone, a tablet, a netbook, a laptop, a desktop computer, a computing pad, a kiosk, a tabletop device, an industrial control device, a wireless charging station, an electric automobile charging station, and other computing devices. Additionally, the computing device 500 may represent a group of processing units or other computing devices.

In this example, the computing device 500 includes one or more computer-readable media, such as a memory area 510 storing computer-executable instructions, application data, template data, user data, and/or other data, and one or more processors 520 programmed to execute the computer-executable instructions for implementing aspects of the disclosure. The memory area 510 includes any quantity of media associated with or accessible by the computing device. The memory area 510 may be internal to the computing device (as shown in FIG. 4), external to the computing device (not shown), or both (not shown).

In some examples, the memory area 510 stores, among other data, one or more apps 110 (shown in FIG. 1) and/or one or more templates 440 (shown in FIG. 3). In one example, a memory area 510 associated with the application server 410 stores one or more apps 110, a memory area 510 associated with the template server 420 stores one or more templates 440, and a memory area 510 associated with the mobile device 100 stores one or more apps 110 and/or one or more templates 440.

The processor 520 includes any quantity of processing units, and the instructions may be performed by the processor 520 or by multiple processors within the computing device or performed by a processor external to the computing device. In some examples, the processor 520 is programmed to execute instructions such as those illustrated in the figures (e.g., FIGS. 5 and 6).

In some examples, the processor 520 is transformed into a special purpose microprocessor by executing computer-executable instructions or by otherwise being programmed. For example, the UI automation component 450, when executed by the processor 520, causes the processor 520 to automatically interact with the app 110 to navigate through various pages 210 and captures content displayed by the app 110 during runtime; the template generation component 460, when executed by the processor 520, causes the processor 520 to process the content by using complex entity extraction techniques to produce an entity template for each page class 140 in the app 110; the instrumenter component 470, when executed by the processor 520, causes the processor 520 to inject entity templates and logging code into the app 110 to capture user interactions; and/or the entity extraction component 480, when executed by the processor 520, causes the processor 520 to log user interactions, and analyze the user interactions using the templates 440. Although the processor 520 is shown separate from the memory area 510, examples of the disclosure contemplate that the memory area 510 may be onboard the processor 520 such as in some embedded systems.

In some examples, the computing device 500 includes at least one user interface 530 (e.g., user interface 130) for exchanging data between the computing device 500 and a user 540. For example, the user interface 530 includes and/or is coupled to a presentation device (not shown) configured to present information, such as text, images, audio, video, graphics, alerts, and the like, to the user 540. The presentation device may include, without limitation, a display, a speaker, and/or a vibrating component. Additionally or alternatively, the user interface 530 includes and/or is coupled to an input device (not shown) configured to receive information, such as user commands, from the user 540. The input device may include, without limitation, a controller, a camera, a microphone, and/or an accelerometer. In at least some examples, the presentation device and the input device are integrated in a common user interface 530 configured to present information to the user 540 and receive information from the user 540. For example, the user-interface device may include, without limitation, a capacitive touch screen display and/or a controller including a vibrating component.

In some examples, the computing device 500 includes at least one communication interface 550 for exchanging data between the computing device 500 and a computer-readable media and/or another computing device. In this example, the mobile device 100 is coupled to the application server 410 and the template server 420 via a network 430. Communication between the computing device 500 and a computer-readable media and/or another computing device may occur using any protocol or mechanism over any wired or wireless connection.

The block diagram of FIG. 4 is merely illustrative of an example system that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 4 may be performed by other elements in FIG. 4, or an entity (e.g., processor, web service, server, apps 110, computing device, etc.) not shown in FIG. 4.

Figure 5:
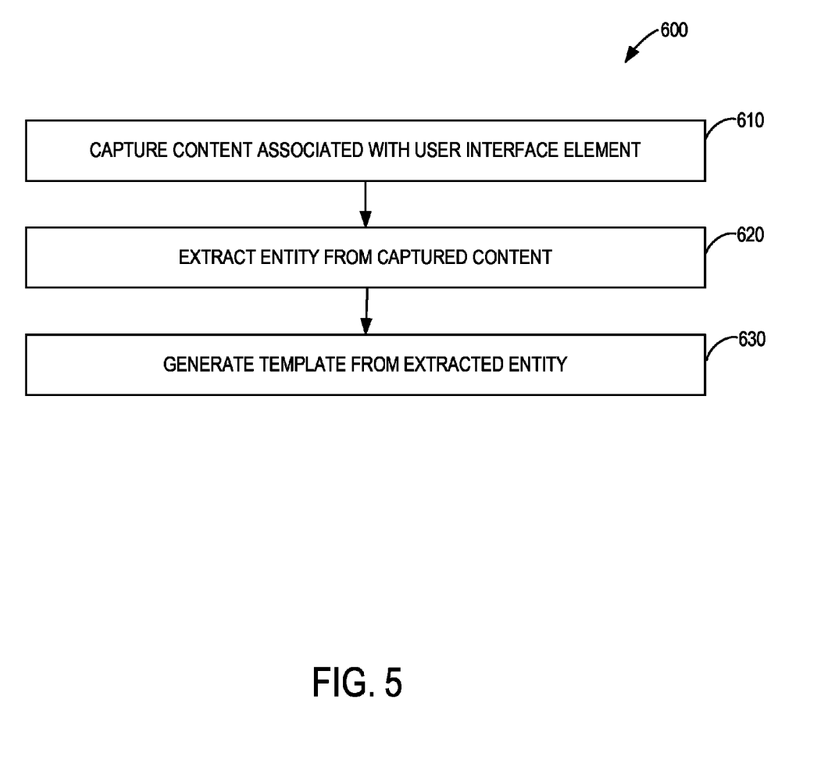
FIG. 5 is an example flow chart illustrating operation of a system such as shown in FIG. 4.

FIG. 5 is an example flow chart illustrating a method 600 of operating one or more computing devices 500 (shown in FIG. 4) to generate a template 440 associated with an app 110. In some examples, an app 110 and/or a template 440 associated with the app 110 are downloaded to a mobile device 100. In one example, the app 110 is detected and/or identified to be on the mobile device 100 by the template server 420, and the associated template 440 is automatically generated by the template server 420 based on the identification of the app 110. In another example, the download of the app 110 is detected and/or identified by the mobile device 100, and the associated template 440 is automatically requested and/or downloaded by the mobile device 100 based on the identification of the app download. In yet another example, the template 440 is associated with the app 110 prior to the app 110 being downloaded by the mobile device 100, and the template 440 is downloaded by the mobile device 100 concurrently and/or substantially concurrently with the app 110. Alternatively, the app 110 and/or the template 440 may be generated and/or downloaded by or from any computing device and at any time that enables the system 400 to function as described herein.

In some examples, the app 110 is automatically executed offline by the template server 420 in a user-agnostic manner. The template server 420 may navigate through various pages 210 in the app 110 by automatically interacting with the UI elements 190, and identify and capture content (e.g., a text string) associated with each UI element 190 (e.g., a textbox) at 610. For example, the template server 420 interacts with the UI elements 190 by automatically tapping on buttons, automatically filling out text fields, and/or automatically swiping pages 210. In some examples, at least a portion of tree 200 (shown in FIG. 2) is traversed when the template server 420 navigates through various pages 210 in the app 110. In one example, the template sever 420 includes and/or has access to log in information (e.g., username, password) to enable the template server 420 to navigate through secure pages 210 in the app 110. In some examples, the app 110 is executed a plurality of times over a period of time to log changes in UI structure, UI elements 190, and/or content over the period of time.

In some examples, one or more entities are automatically extracted from the captured content at 620. For example, content associated with each UI element 190 (e.g., a text string) is annotated with semantic information (e.g., cuisine type, price range) as the template server 420 navigates through various pages 210 in the app 110 and/or interacts with the UI elements 190.

In at least some examples, a probability of classifying UI element content (e.g., text associated with an entity) is determined for each entity type, and the content is classified in an entity type based on a comparison of the determined probabilities. In some examples, the template server 420 refers to a relevant dictionary. For example, when classifying content for a restaurant booking application, the template server 420 refers to one or more dictionaries containing restaurant types, cuisines, and addresses, and, when classifying content for a music application, the template server 420 refers to one or more dictionaries containing music genres, song titles, and artist names.

In some examples, content is classified based on a match or similarity of the content with an entry in a relevant dictionary. Matching content to dictionary entries is generally a Boolean function. Content that matches a dictionary entry exactly may be classified with increased confidence. An example is shown in Equation (1) below.

$$w_{x,e} = 100\% \text{ or close to } 100\% \tag{1}$$

where w is weight, x is entity content, e is entity type.

For at least some entity types having some complexity and/or ambiguity, such as restaurant names or song titles, the classification is based on whether the content matches a first predetermined proportion (e.g., 90%) of an entry in a relevant dictionary. By using the first predetermined proportion, the Boolean function is configured to accommodate for some differences between the content and the dictionary entries including word variations (e.g., Café vs. Cafeteria) and/or additional/missing words (e.g., the content is "ABC Restaurant" and the dictionary entry is "ABC") when determining whether the content matches a dictionary entry.

For at least some entity types having more complexity and/or ambiguity, such as recipes, the classification is based on whether the content matches a second predetermined proportion that is lower than the first predetermined proportion of an entry in a relevant dictionary. By using the second predetermined proportion, the Boolean function is configured to accommodate for more differences (e.g., than the first predetermined proportion) between the content and the dictionary entries. For example, at least some recipes have creative names and/or include a combination of ingredients that does not exactly match any recipe within a relevant dictionary. Additionally or alternatively, at least some dictionaries are incomplete and/or are limited in size. In some examples, a similarity-capturing metric (e.g., tf-idf based cosine similarity) is used to determine whether the content matches the dictionary entry. At a high level, the tf-idf value of the content increases proportionally to a number of times its words appear in the dictionary entry (e.g., term frequency) and is offset by a number of times its words appear in the dictionary (e.g., inverse document frequency) to accommodate for frequently-used words. Alternatively, the similarity and/or differences between the content and the dictionary entry may be determined using any metric and/or algorithm that enables the mobile device 100 to function as described herein.

In some examples, content is classified in an entity type based on a length of the content. In at least some examples, the length of the content is compared to a length distribution associated with the entity. In at least some examples, if the content has fewer (or more) words than a lower (or upper, respectively) bound of known content of an entity type, then the content is not classified in the entity type. An example is shown in Equation (2) below.

$$w_{x,e} = 0\% \text{ or close to } 0\% \qquad (2)$$

For example, names of restaurants are generally shorter than addresses, and addresses are generally less than 20 words. In at least one example, when the content has 50 words and an upper bound of known addresses has 13 words, then the content is not classified as an address entity type with increased confidence. An example is shown in Equation (3) below.

$$w_{x,e} = 0\% \text{ or close to } 0\% \qquad (3)$$

In some examples, a confidence level or weight of the content not being classified in any entity type is determined as shown in Equation (4) below.

$$w_{x,\phi} = k * \Pi_e (1 - w_{x,e}) \qquad (4)$$

where $$k = \frac{n}{n+c} \qquad (5)$$

In Equation (5) above, n is the number of entities to be recognized, and c controls an aggressiveness of the entity classification. Intuitively, $w_{x,\phi}$ is close to zero when the content is classified in one or more entity types with increased confidence, and is close to one when the content is not classified in any entity type with increased confidence. In some examples, the confidence levels or weights (e.g., $w_{x,e}$) for classifying content in an entity type are normalized to determine one or more probabilities of classifying content in an entity type as shown in Equation (6) below.

$$p_{x,e} = w_{x,e}/(w_{x,\phi} + \Sigma w_{x,e}) \qquad (6)$$

In some examples, the pages 210 navigated as the template server 420 interacts with the UI elements 190 are identified and automatically clustered into a plurality of page classes 140 based on a structure of the UI elements 190 on each page 210. A similarity across pages 210 of a common page class 140 is exploited to classify the content. In at least one example, the probability of a UI element $_{ux}$ to be of entity type e is calculated as shown in Equation (7) below.

$$p^u(e) = \Sigma p_i^u(e)/n \qquad (7)$$

where x1, x2, ..., xn are the pages instantiated from a page class X; $u_{x_j}$ is the content of UI element ux contained in page class X; and $p_i^u(e)$ is the probability of entity content $u_{x_j}$ being of entity type e.

For example, when the content associated with a UI element 190 at the top of a first page includes ambiguous text (e.g., "Main Street"), the template server 420 has relatively low confidence in classifying the content. When the UI element 190 at the top of other pages in the same page class 140 is associated with a restaurant name, the template server 420 classifies the content as a restaurant name with increased confidence (e.g., 90%). Similarly, when the UI element 190 at the top of other pages in the same page class 140 is associated with an address, the template server 420 classifies the content as a street name with increased confidence (e.g., 85%).

Additionally or alternatively, a similarity across UI elements 190 within a page 210 is exploited to classify content. In some examples, the template server 420 identifies a page 210, identifies one or more patterns 330 of UI elements 190 within the page 210, and classifies content with increased confidence when a page 210 includes a pattern 330 and/or a pattern window 340. In one example, when a list includes three UI elements 190 and two of the UI elements 190 are associated with content classified as a restaurant name, the template server 420 classifies content associated with the third UI element 190 as a restaurant name with increased confidence. In some examples, the template server 420 identifies one or more pattern windows 340 including a plurality of occurrences of patterns 330.

In the example shown in FIG. 2, a probabilistic sequence S of n uncertain items (e.g., UI elements) includes nine T nodes (e.g., text 250, 280, 290, 300, and 320). A pattern window 340 is a portion of the probabilistic sequence S within which the pattern 330 repeats or is likely to repeat. In some examples, the pattern window 340 is identified based on a uniform structure including a repeated path-to-root pattern. For example, text 250, 300, and 320 do not share a path-to-root pattern (e.g., the path-to-root for text 250, 300, and 320 are T-B-G-P; T-G-P; and T-B-G-P, respectively) and, thus, are not likely to be in a pattern 330. First text 280 and second text 290 share a common path-to-root pattern (e.g., the path-to-root for each first text 280 and second text 290 is T-C-L-G-P) and, thus, are likely to be in a pattern 330. In some examples, nodes with a common path-to-root value form one pattern window 340. In the example shown in FIG. 2, the pattern window 340 includes first text 280 and second text 290. A page may include multiple pattern windows 340.

For each pattern window 340, one or more possible pattern lengths are determined. For example, possible pattern lengths for a pattern window 340 including six nodes, such as the pattern window 340 shown in FIG. 2, are two, three, and six (e.g., there may three groups having a pattern length of two, two groups having a pattern length of three, or one group having a pattern length of six). Some pattern lengths are unlikely due to the UI structure. In the example shown in FIG. 2, a pattern length of three is unlikely because that would make the C nodes heterogeneous.

In some examples, an expected frequency is determined for each pattern window 340 and for each possible pattern length (e.g., two, three, and six) or each likely pattern length (e.g., three and six). In at least some examples, the expected frequency of a pattern p in a probabilistic sequence S is calculated as shown in Equation (8) below.

$$\Sigma s_i P(S_i) C(S_i, p) \qquad (8)$$

A pattern 330 with an expected frequency that satisfies (e.g., is greater than) a predetermined threshold is determined to be a frequent pattern. When a plurality of patterns 330 satisfy the predetermined threshold, in at least some examples, the smallest pattern with an expected frequency that satisfies the predetermined threshold is identified as the frequent pattern. If no pattern 330 satisfies the predetermined threshold, in at least some examples, then no pattern 330 is found to be the frequent pattern.

Figure 6:
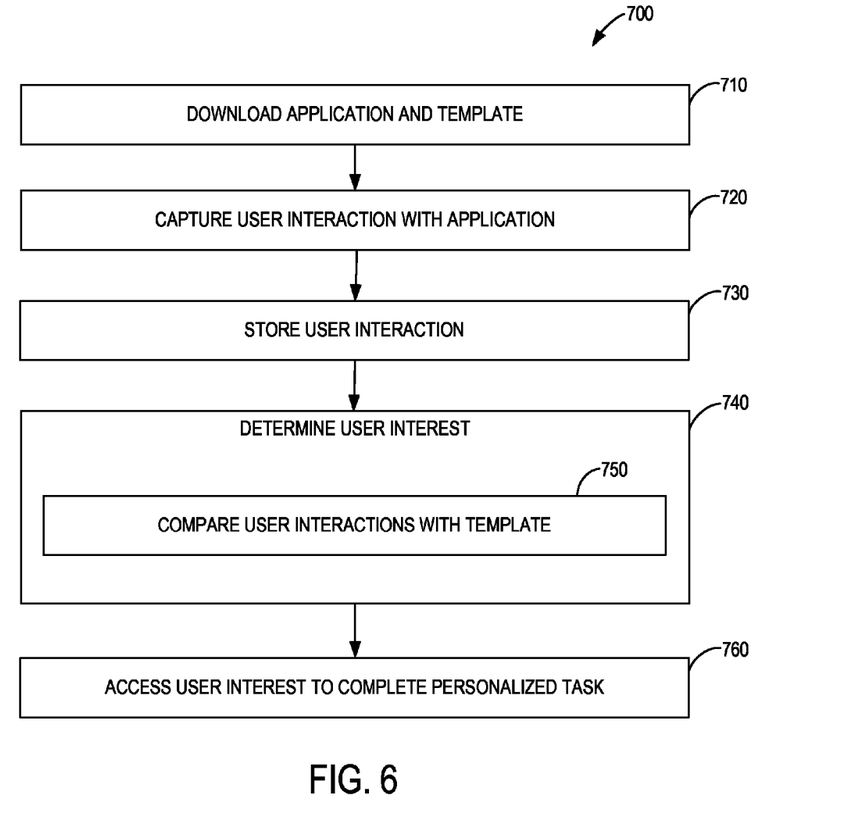
FIG. 6 is an example flow chart illustrating operation of a mobile device such as shown in FIG. 1.

In some examples, one or more templates 440 are generated from the plurality of entities at 630. In some examples, a template 440 is generated for each page class 140 of an app 110 where each UI element 190 in the UI tree associated with the page class 140 is annotated with some metadata, such as entity type. For example, entities may be automatically extracted from the captured content to generate a template 440 for each page class 140 in the app 110. In some examples, templates 440 and logging code are injected into the application binary code to enable user interactions to be captured during runtime efficiently. In some examples, template 440 is configured to guide capturing of relevant content in the application by extracting text content only from each UI element that appears in the template 440. In some examples, template 440 is matched against the content extracted to be classified as entities in real time with low overhead FIG. 6 is an example flow chart illustrating a method 700 of operating a mobile device 100 (shown in FIG. 1). The mobile device 100 receives, retrieves, and/or downloads an app 110 and a template 440 associated with the app 110 at 710. One or more user interactions with the app 110 are captured at 720. In some examples, content, UI elements 190, and/or UI structure are captured when a page 210 is initially loaded and each time a user 540 interacts with any UI element 190 in the page. Accordingly, changes in the content (e.g., a text field for entering a search keyword), UI element 190, and/or UI structure between page loads and/or button taps are captured. In some examples, at least a portion of tree 200 (shown in FIG. 2) is traversed when the one or more user interactions are processed. In some examples, template 440 decides which portions of the tree 200 to traverse and which portions of the tree 200 to skip.

In some examples, the template 440 enables semantics to be efficiently inferred directly on the mobile device 100. For each entity the user 540 interacts with or visits within an app 110, the entity name and a list of key-value pairs indicating various semantic information of the entity, as well as syntactical information about where the entity appears in the app 110 are extracted. For example, templates 440 include a name and/or a category for each entity. In some examples, additional semantics are inferred by looking at entities appearing on the same page 210 or on previous pages 210 in its trace. In at least some examples, the trace is a list of key-value pairs indicating what the user did with the entity, whether and how the user expressed interest in it, as well as the low-level sequence of UI actions the user took to reach the entity. For example:

interactions={seconds_spent=23.12,taps='pin to start',num_taps=2, num_visits=5,actions='book table'},
trace={Launch('[Restaurant application name] '),Click(button9), Click(button5)}

For another example, by knowing that a user 540 selected "Thai" cuisine and "cheap" price in previous pages 210 to reach a restaurant entity and one address appears next to it, the entity is associated with "Thai" cuisine, "cheap" price, and the address. The user interactions enable the template 440 to infer richer semantics of an entity. For example, on recognizing a restaurant entity on a page 210 that the user 540 reached after selecting a specific cuisine type and a price range in a previous page 210, the cuisine type and/or the price range is associated with the recognized restaurant entity.

In some examples, each entity interacted with by the user 540 is captured, and one or more logs of user interactions are stored at a storage device (e.g., memory area 510) at 730. In at least some examples, the logs are processed by applying one or more templates 440 and/or extracting one or more entities. In at least some examples, extracted entities are stored at the storage device (e.g., in one or more tables). A subset of the entities may be relevant and/or of interest to the user 540. That is, one or more user interests are determined at 740 based at least in part on the extracted entities. In this example, the relevant entities are stored at the storage device (e.g., in one or more tables), from which the relevant entities may be shared with the device OS, its services, and/or other apps 110. In one example, the logs are processed at runtime. Alternatively, the logs may be processed at one or more predetermined times and/or periods (e.g., once a day, when the mobile device 100 is charging). The user interests may be determined by comparing the user interactions with the entities and/or the template 440 at 750. For example, a user 540 may use an app 110 to browse through many restaurants but eventually call only one. The entities that are more relevant to the user are filtered from the entities that are less relevant to the user. Entities are also processed and updated over time to ensure additional metadata such as usage information (e.g., the same restaurant has been visited multiple times) is generated and updated, such that the additional metadata (e.g., usage information) is associated with the entities.

In at least some examples, one or more UI elements 190 are compared with the entity templates to identify a first set of UI elements 190 that correspond with entities associated with the template 440, and a second set of UI elements 190 that do not correspond with any entity associated with the template 440. For example, one or more UI elements 190 that do not correspond with any entity of the plurality of entities may be determined. In at least some examples, the first set of UI elements 190 are inspected and/or captured, and the second set of UI elements 190 are not inspected and/or captured. In at least some examples, the one or more UI elements 190 that do not correspond with any entity is ignored.

In some examples, relevant content is retrieved based on the user interactions with the app 110. One or more relevant entities (or, conversely, less-relevant entities) are determined by comparing the one or more user interactions with the plurality of entities. Example user interactions include tap events on UI elements 190 like buttons, hyperlinks, and/or images. In some examples, interacting with UI elements 190 indicating positive sentiment may be used to indicate user interest (e.g., relevance). Example labels used in UI elements 190 that are associated with user interest include "Like", "Share", and "Add to favorites". In some examples, implementing exit actions by, for example, launching another app 110 or using an OS feature may be used to indicate user interest. Example exit actions include opening a Uniform Resource Locator link in a browser, making a reservation through another app 110, and making a phone call using a phone feature. In some examples, an amount of time spent on a page 210 (e.g., an absolute amount of time spent on the page 210 and/or an amount of time spent on the page 210 relative to other pages 210) and/or a number of occurrences of a particular entity on the page 210, within a period of time, across a plurality of pages 210, and/or across a plurality of apps 110 may be used to indicate user interest.

User interest may be determined based on any criteria that enable app 110 and/or template 440 to function as described herein. In some examples, the relevant entities are logged, and a user profile is generated based on one or more of the relevant entities (e.g., user interests).

In some examples, the device OS, its services, and/or other apps 110 may access at least some data (e.g., relevant entities, user interests) at 760 to present and/or complete a personalized task. For example, in at least some examples, the user interactions are automatically repeated to enable task completion when, for example, the user 540 requests previously-consumed content associated with an entity (e.g., a restaurant) or inputs a specific action associated with the entity (e.g., viewing the menu of the restaurant). The user interactions are captured and/or stored, such that the user interactions are repeatable to perform various tasks with little to no additional user input. In some examples, redundant user interactions and/or loops of user interactions are filtered out to generate a shorter continuous sequence of user interactions leading to the previously consumed content. Repeating the user interactions retrieves the previously consumed content, such that the content is re-presentable to the user 540. In some examples, the previously consumed content is determined and/or identified to be relevant content and is stored to increase accessibility and/or availability.

In some examples, when the trace of the previous user interactions is no longer valid and/or projected to be unrepeatable (e.g., one of the user interactions is not repeatable due to dynamic content), the sequence of user interactions is computed offline, in the cloud, cached on the device on a regular basis (e.g., daily), and repeated to retrieve the previously-consumed content. In some examples, when an app 110 is opted in, an explicit service application programming interface (API) is used to invoke the application functionality and retrieve the relevant content.

In some examples, a personal digital assistant (e.g., SIRI brand voice recognition software, GOOGLE NOW brand voice recognition software, CORTANA brand voice recognition software) is automatically initiated and/or automatically performs tasks (e.g., opens an app 110, navigates the app 110, and/or retrieves content) and/or provides targeted services (e.g., generate targeted search results, present targeted content) based on the entities extracted from the user interactions and/or the inferred user profile. (SIRI is a trademark of Apple Inc., GOOGLE NOW is a trademark of Google Inc., and CORTANA is a trademark of Microsoft Corporation). For example, identifying that a user 540 has selected a restaurant in an app 110 enables the personal digital assistant to invoke and/or actuate another app 110 to present reviews of the restaurant to the user 540 and/or recommend other restaurants based on the restaurant. For another example, identifying that a user 540 has selected many vegetarian restaurants within an app 110 enables the personal digital assistant to infer what types of restaurant to retrieve upon receiving a search request for a restaurant. For yet another example, identifying how a user 540 interacts with an app 110 to reserve a restaurant enables the personal digital assistant to automatically complete the task in a similar manner upon receiving a request to reserve a restaurant.

In at least one example, a user 540 asks the personal digital assistant to view the menu of the user's favorite Chinese restaurant. To complete the task, the personal digital assistant determines what the user's favorite restaurant is, and determines how to retrieve the menu from the favorite restaurant. For example, the personal digital assistant submits a query for the user's favorite Chinese restaurant.

```
SELECT name FROM [Application name]
WHERE info.type = 'restaurant'
AND info.cuisine = 'Chinese'
AND (interaction.num_visits > 3
OR interaction.actions='book table'
OR interaction.taps='add to favorites')
```

When an entity named "ABC Restaurant" is returned, the personal digital assistant then submits a query to extract the trace of the interaction with an entity associated with the menu (e.g., a "view menu" event).

```
SELECT trace FROM [Application name]
WHERE name = 'ABC Restaurant'
AND interaction.taps = 'view menu'
```

In some examples, a library enables context-sensitive pop-up menus to be presented on the mobile device 100 based on the template 440. The library may include a collection of generic functionality, such as purchasing music, calling a phone number, and invoking a map to show an address, and invoke the correct functionality based on the entity type of the selected UI element 190. For example, depending on whether a user 540 selects a song name or a restaurant name, the library pops up a menu with options to purchase the song or to call the restaurant, respectively. In some examples, the library is automatically injected into the application binary code. For example:

```
SELECT info.type FROM [Application name]
WHERE name=uiElement.content
```

In some examples, entities, user interactions, and/or application data collected to recognize entities are stored locally on the mobile device 100 and made available to the device OS and its services (e.g., the personal digital assistant), as well as to other apps running on the mobile device (if granted permission). The device OS, its services, and/or other apps that consume the collected data may be configured to provide targeted services based on the collected analytics. For example, an app and/or service may be configured to provide targeted content (e.g., advertising) by using richer user profiles. An app marketplace may generate recommendations on one or more apps to install on the mobile device 100 based on user interests. A music player app and/or music marketplace app may generate recommendations on one or more songs to download and/or automatically generate playlists based on user interests.

In at least some examples, the collected data is communicated off of the mobile device 100 and/or with another app on the mobile device 100, only when granted permission (e.g., authorized) by the user 540, such that at least some privacy is preserved. For example, the user 540 may manage a security and/or access control module that determines which apps 110 and/or OS services can access the collected data. In some examples, third-party apps 110 on the mobile device 100 may access data from another app 110 on the mobile device 100 only when in compliance with the terms of user and/or service and/or granted permission by the user 540. In at least some examples, a data policy engine is used to enforce the terms of use and/or service and/or user authorization.

In some examples, one or more terms of use and/or service associated with one or more apps 110 are identified, and behavioral analytics extracted from the apps 110 are managed in compliance with the one or more terms of use and/or service. In one example, a request to perform a function and/or service is received, determined, and/or identified, and the mobile device 100 determines whether the function is in compliance with (e.g., violates) one or more of the terms of use and/or service. When the function is determined to be in compliance with the terms of use and/or service, the mobile device 100 invokes the function. When the function is determined to not be in compliance with (e.g., violate) one or more of the terms of use and/or service, the mobile device 100 does not invoke the function and/or service and/or presents an indication that the request is denied.

Additionally or alternatively, a request to perform a function and/or service is received, determined, and/or identified, and the mobile device 100 determines whether the function is authorized and/or has previously been authorized by the user 540. When the function is determined to be authorized by the user 540, the mobile device 100 invokes the function. When the function is determined to not be authorized by the user 540, the mobile device 100 prompts the user to authorize the function. Alternatively, the mobile device 100 does not invoke the function and/or service and/or presents an indication that the request is denied.

For example, when a request for data associated with the collected data is received from a local application and/or remote device, the mobile device 100 determines whether transmission of the collected data is in compliance with (e.g., violates) one or more of the terms of use and/or service and/or is authorized by the user 540. When the function is determined to be in compliance with the terms of use and/or service and/or is authorized by the user 540, the mobile device 100 transmits the collected data to the remote device. When the function is determined to not be in compliance with (e.g., violate) one or more of the terms of use and/or service and/or is not authorized by the user 540, the mobile device 100 does not transmit the collected data to the remote device and/or service and/or presents an indication that the request is denied.

The subject matter described herein enables mobile devices to extract behavioral analytics from applications efficiently and effectively, and manage the extracted data in a resource-efficient and privacy-sensitive manner. In some examples, an application's structural properties are exploited to automatically annotate the application with semantic information that remains valid at runtime. One or more templates are generated without having access to the application source code and/or without replying on a developer instrumenting the apps. The annotation process is done offline at a remote server in a user-agnostic manner. During runtime, user interactions with the application are captured and semantics are inferred directly on the mobile device. The user interactions are captured in an automated manner and/or with little to no developer effort. In some examples, the user interactions are repeatable to enable task completion when, for example, the user requests a previously seen entity (e.g., a restaurant) or a specific action associated with the entity (e.g., viewing the menu of the restaurant).

Example computer-readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Example computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an example computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

The examples illustrated and described herein as well as examples not specifically described herein but within the scope of aspects of the disclosure constitute example means for managing a plurality of mobile device applications. For example, the elements illustrated in FIGS. 1 and 3, such as when encoded to perform the operations illustrated in FIGS. 6 and 5, respectively, constitute example means for automatically interacting with an application to navigate through various pages of the application and capturing content displayed by the application during runtime, example means for processing contents to generate an entity template for each page class 140 in the application, example means for injecting templates and/or logging code into the application to capture user interactions, and example means for logging user interactions, and recognizing entities based on the user interactions using entity templates.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Alternatively or in addition to the other examples described herein, examples include any combination of the following:

- downloading a template associated with an application, the template including a plurality of entities;
- capturing one or more user interactions with the application;
- determining one or more user interests by comparing the one or more user interactions with the plurality of entities, such that the mobile device is configured to provide a tailored service to a user of the mobile device;
- initiating a tailored service to a user of the mobile device to provide a user task completion;
- comparing at runtime text content of one or more user interface elements associated with the application with the plurality of entities to determine a user interface element of the one or more user interface elements that does not correspond with any entity of the plurality of entities;
- ignoring the text content of the user interface element, such that the text content associated with the user interface element is not processed;
- automatically repeating the one or more captured user interactions with the application to enable relevant content to be retrieved;
- extracting one or more entities of the plurality of entities during runtime;
- storing the one or more captured user interactions and the plurality of entities on the mobile device;
- initiating a task using a personal digital assistant;
- associating usage information to the plurality of entities;
- receiving a request to perform a function;
- determining whether the function is in compliance with one or more terms of use associated with the application;
- presenting an indication that the request is denied;
- determining whether the function is authorized by the user;
- prompting the user to authorize the function;
- presenting an indication that the request is denied;
- automatically generating a template associated with an application and including a plurality of entities;
- transmitting the template to a mobile device, such that the mobile device is configured to capture one or more user interactions with the application, and determine one or more user interests by comparing the one or more user interactions with the plurality of entities, the mobile device configured to provide a tailored service to a user of the mobile device;
- identifying content associated with a plurality of user interface elements associated with the application;
- automatically extracting the plurality of entities from the content;
- automatically annotating one or more user interface elements associated with the application with semantic information;
- classifying content associated with a user interface element associated with the application in an entity type;
- identifying a plurality of pages associated with the application;
- clustering the plurality of pages into page classes;
- identifying a pattern of user interface elements within one or more pages of the plurality of pages;
- identifying a download of the application, wherein the template is automatically generated based on the identified download;
- transmitting the template to the mobile device, such that the mobile device is configured to provide the tailored service to the user without modifying the application, the template generated independent of application source code;
- capturing one or more user interactions with an application of the plurality of applications;
- determining one or more user interests by comparing the one or more user interactions with a template, such that a computing device is configured to provide a tailored service to a user of the computing device, the template including a plurality of entities;
- determining one or more relevant entities by comparing the one or more user interactions with the plurality of entities;
- generating a user profile associated with the user;
- actuating another application of the plurality of applications based on the one or more user interests;
- identifying a download of the application; and
- automatically requesting the template associated with the application.

In some examples, the operations illustrated in FIGS. 5 and 6 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

What is claimed is:

1. A mobile device comprising:
a memory area storing a plurality of applications and computer-executable instructions for managing the plurality of applications; and
a processor configured to execute the computer-executable instructions to:
store a template associated with an application of the plurality of applications, the template including a plurality of entities that are associated with user interface (UI) elements, the template configured to provide context-sensitive information to user interactions with the associated application at runtime to infer semantics of user activities on the mobile device based on at least one of a navigation through a plurality of pages in the application or an interaction with the UI elements performed during runtime, wherein each UI element includes a name and a list of key-value pairs indicating semantic information of content and syntactical information regarding where the entity appears in the application;
receive one or more user interactions with the application based on the template; and
determine one or more user interests by comparing the one or more user interactions with the plurality of entities of the template; and
initiate a tailored service to a user of the mobile device to provide a user task completion, the tailored service inferred based on the one or more determined user interests.

2. The mobile device of claim 1, wherein the processor is configured to:
compare at run time text content of one or more user interface elements associated with the application with the plurality of entities to determine a user interface element of the one or more user interface elements that does not correspond with any entity of the plurality of entities; and
ignore the text content of the user interface element, such that the text content associated with the user interface element is not processed.

3. The mobile device of claim 1, wherein the processor is configured to, based on the one or more user interactions with the application, automatically repeat the one or more captured user interactions with the application to enable relevant content to be retrieved, including to enable the user task completion when the user requests a previously seen entity or a specific action associated with the entity, and the user task completion comprises relevant content determined based at least in part on indicators of interest including clicks on UI controls indicating at least one of positive sentiment, exit actions, time spent, number of taps, entity recurrence, or cross-application interactions.

4. The mobile device of claim 1, wherein the processor is configured to:
extract one or more entities of the plurality of entities during runtime; and
store the one or more captured user interactions and the plurality of entities on the mobile device.

5. The mobile device of claim 1, wherein the processor is configured to initiate a task using a personal digital assistant.

6. The mobile device of claim 1, wherein the processor is configured to associate usage information to the plurality of entities.

7. The mobile device of claim 1, wherein the processor is configured to:
receive a request to perform a function;
determine whether the function is in compliance with one or more terms of use associated with the application; and
when the function is not in compliance with the one or more terms of use, present an indication that the request is denied.

8. The mobile device of claim 1, wherein the processor is configured to:
receive a request to perform a function;
determine whether the function is authorized by the user; and
when the function is not authorized by the user, one of prompt the user to authorize the function and present an indication that the request is denied.

9. A server comprising:
a memory area storing a plurality of templates and computer-executable instructions for managing the plurality of templates; and
a processor configured to execute the computer-executable instructions to:
automatically generate a template of the plurality of templates, the template associated with an application and including a plurality of entities that are associated with user interface (UI) elements, the template configured to provide context-sensitive information to user interactions with the application at runtime to infer semantics of user activities based on at least one of a navigation through a plurality of pages in the application or an interaction with the UI elements performed during runtime, wherein each UI element includes a name and a list of key-value pairs indicating semantic information of content and syntactical information regarding where the entity appears in the application; and
transmit the template to a mobile device, such that the mobile device is configured to capture one or more user interactions with the application, and determine one or more user interests by comparing the one or more user interactions with the plurality of entities, the mobile device configured to provide a tailored service to a user of the mobile device.

10. The server of claim 9, wherein the processor is configured to:
identify content associated with a plurality of user interface elements associated with the application; and
automatically extract the plurality of entities from the content, wherein the template is generated based on the extracted plurality of entities.

11. The server of claim 9, wherein the processor is configured to automatically annotate one or more user interface elements associated with the application with semantic information.

12. The server of claim 9, wherein the processor is configured to classify content associated with a user interface element associated with the application in an entity type.

13. The server of claim 9, wherein the processor is configured to:
identify a plurality of pages associated with the application;
cluster the plurality of pages into page classes; and
identify a pattern of user interface elements within one or more pages of the plurality of pages.

14. The server of claim 9, wherein the processor is configured to identify a download of the application, wherein the template is automatically generated based on the identified download.

15. The server of claim 9, wherein the processor is configured to transmit the template to the mobile device, such that the mobile device is configured to provide the tailored service to the user without modifying the application, the template generated independent of application source code.

16. A method for managing a plurality of applications, said method comprising:

receiving, at a computing device, one or more user interactions with an application of the plurality of applications based on a template including a plurality of entities that are associated with user interface (UI) elements, the template configured to provide context-sensitive information to user interactions with the application at runtime to infer semantics of user activities on the computing device based on at least one of a navigation through a plurality of pages in the application or an interaction with the UI elements performed during runtime, wherein each UI element includes a name and a list of key-value pairs indicating semantic information of content and syntactical information regarding where the entity appears in the application; and determining one or more user interests by comparing the one or more user interactions with the template at the computing device, such that the computing device is configured to provide a tailored service to a user of the computing device, the template associated with the application of the plurality of applications, the template including a plurality of entities.

17. The method of claim 16 further comprising determining one or more relevant entities by comparing the one or more user interactions with the plurality of entities.

18. The method of claim 16 further comprising, based on the one or more user interests, generating a user profile associated with the user.

19. The method of claim 16 further comprising actuating another application of the plurality of applications based on the one or more user interests.

20. The method of claim 16, further comprising:

identifying a download of the application; and automatically requesting the template associated with the application.

* * * * *